J. NOLAND & C. NEIDICH.
Coffee-Pot and Tea-Pot.

No. 163,233.  Patented May 11, 1875.

Witnesses:
John Monks.
W. C. Smith

Inventors.
John Noland
Chas. Neidich

UNITED STATES PATENT OFFICE.

JOHN NOLAND AND CHARLES NEIDICH, OF OIL CITY, PENNSYLVANIA.

IMPROVEMENT IN COFFEE-POTS AND TEA-POTS.

Specification forming part of Letters Patent No. 163,233, dated May 11, 1875; application filed December 14, 1874.

*To all whom it may concern:*

Be it known that we, JOHN NOLAND and CHARLES NEIDICH, of Oil City, in the county of Venango, in the State of Pennsylvania, have invented a new and Improved Arrangement for Extracting the Substance from Tea, Coffee, or other ingredients.

Our invention relates to the construction of a box arranged to float on the surface of water, and perforated on the top and bottom, so that the water will pass through, and thereby extract the substance from whatever ingredient may be boiled in the same; and we do hereby declare that the following is a full, clear, and exact description thereof, reference being had to the accompanying drawing, and to the letters of reference thereon marked.

Figure 1:
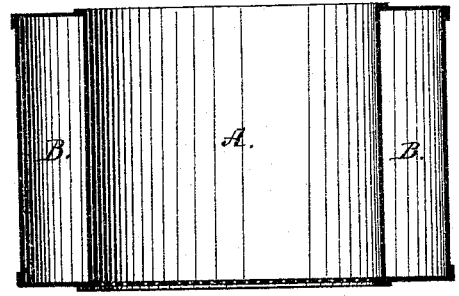
Figure 2:
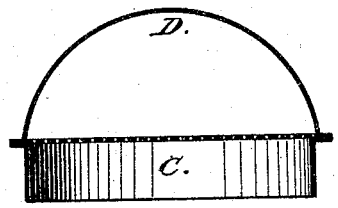

Figure 1 represents a central vertical section of the extractor. Fig. 2 represents a central vertical section of the lid or cover for the same.

A represents a box, made of any suitable material, and of any convenient size or shape, so arranged and constructed as to float in water, having both top and bottom perforated, so as to allow the water to pass through the box, for the purpose of more skillfully steeping or boiling tea, coffee, or other ingredients. B represents a hollow rim around the box A, so arranged as to form a chamber for air, the object of which is to keep the perforated box A to the surface, so that the constant commotion of the boiling water may more effectually extract the substance from the ingredients contained in box A. C represents the lid or top of the box A, constructed to fit the box tight enough, so that, by taking hold of the ring D, the box can be carried or lifted at will.

We are aware that an air-float, to which is suspended a bag containing coffee, has heretofore been employed, and we therefore disclaim such invention.

What we claim as our invention, and desire to secure by Letters Patent, is—

The box A, having the perforated bottom and removable perforated top, in combination with the concentric air-chamber B, whereby the box is supported in the liquid, as specified.

JOHN NOLAND.
CHARLES NEIDICH.

Witnesses:
JOHN MONKS,
W. O. SMITH.